United States Patent
Strandjord et al.

(10) Patent No.: US 7,630,082 B2
(45) Date of Patent: Dec. 8, 2009

(54) SYSTEMS AND METHODS FOR HIGH PRECISION FEEDBACK CONTROL IN CLOSED LOOP SENSORS

(75) Inventors: Lee K. Strandjord, Tonka Bay, MN (US); Norman G. Tarleton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 421 days.

(21) Appl. No.: 11/734,744

(22) Filed: Apr. 12, 2007

(65) Prior Publication Data

US 2008/0252500 A1    Oct. 16, 2008

(51) Int. Cl.
*G01C 19/72* (2006.01)
*G02B 6/00* (2006.01)
*G01P 3/00* (2006.01)

(52) U.S. Cl. .............. 356/460; 385/12; 73/504.01
(58) Field of Classification Search .......... 356/459, 356/460, 461, 472; 73/504.01; 385/12
See application file for complete search history.

(56) References Cited

U.S. PATENT DOCUMENTS

2009/0095078 A1* 4/2009 Rozelle ............... 73/504.13
2009/0161112 A1* 6/2009 Urgell et al. ........... 356/464

* cited by examiner

*Primary Examiner*—Patrick J Connolly
(74) *Attorney, Agent, or Firm*—Fogg & Powers LLC

(57) ABSTRACT

Improved methods and systems for feedback signals in a sensor system. An example method demodulates a sense signal using an analog demodulator and also demodulates the sense signal using a digital demodulator. The difference between the result of the analog demodulator and the digital demodulator is determined and then integrated. A sensor feedback control signal is generated based on the integrated difference.

18 Claims, 7 Drawing Sheets

SYSTEMS AND METHODS FOR HIGH PRECISION FEEDBACK CONTROL IN CLOSED LOOP SENSORS

BACKGROUND OF THE INVENTION

Closed loop sensing systems, such as accelerometers and gyroscopes, that include synchronous detection perform the best when they include a feedback loop with relatively high bandwidth, high dynamic range and high precision. Typical analog feedback loops provide high bandwidth and dynamic range, but have limited precision due to analog errors, such as offset voltages and demodulator imperfections. Common high bandwidth digital feedback loops with digital demodulators and accumulators offer high precision but exhibit lower dynamic range. High speed digital to analog converters (DACS) are typically limited to about 16 bits of resolution. DACs with higher resolution exists, but at the expense of lower bandwidth.

Therefore, there exists a need for high bandwidth, high dynamic range and high precision feedback loops used in sensing systems.

SUMMARY OF THE INVENTION

The present invention provides improved methods and systems for feedback signals in a sensor system. An example method demodulates a sense signal using an analog demodulator and also demodulates the sense signal using a digital demodulator. The difference between the result of the analog demodulator and the digital demodulator is determined and then integrated. A sensor feedback control signal is generated based on the integrated difference.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
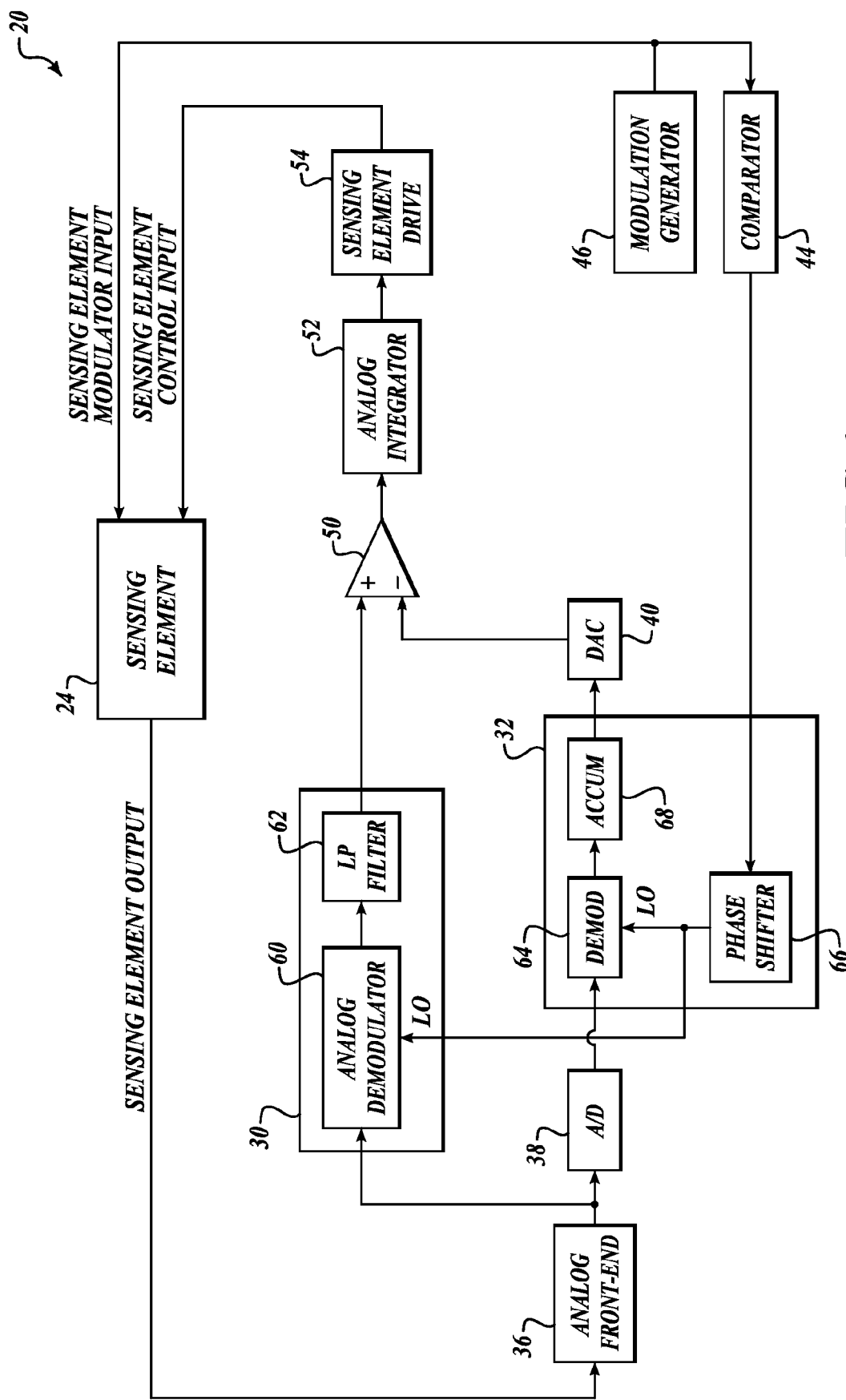
FIGS. 1-4 illustrate examples of systems formed in accordance with various embodiments of the present invention.

FIG. 1 shows an example system 20 that includes a sensing element 24, analog front-end circuit components 36, an analog-to-digital (A/D) converter 38, an analog demodulation component 30, a digital signal processing component 32, a digital-to-analog converter (DAC) 40, an operational amplifier (Op Amp) 50, an analog integrator 52, a sensing element drive 54, a modulation generator 46, and a comparator 44. The analog demodulation component 30 includes an analog demodulator 60 and a low pass filter 62. The digital signal processing component 32 includes a demodulator 64, an accumulator 68, and a phase shifter 66. The resonator fiber optic gyro (RFOG) (24) is a rotation sensor that may employ this type of signal processing and control. For the RFOG, the sensing element drive 54 controls a laser frequency to a resonance frequency of a fiber ring resonator. The modulation generator 46 modulates the laser frequency, which is converted to a light intensity signal by the resonator. The light intensity signal is converted to a voltage signal by a photodetector (not shown). The voltage detector signal passes through the analog front-end 36 to be demodulated by analog demodulator 60 and digital demodulator 64. The output of the analog demodulator 60 is a combination of a resonance error signal and demodulator errors. The resonance error signal is approximately proportional to the difference between the laser frequency and the fiber ring resonator resonance frequency for a frequency range of about half the resonator resonance width away from the resonance frequency. For an ideal resonator the resonance error signal is zero when the laser frequency is at the resonator resonance frequency. To control the laser to the resonator resonance frequency, the analog integrator 52 integrates the error signal and adjusts the laser frequency until the error signal is driven to zero value. However, imperfections in the analog demodulator 60 and analog integrator 52 result in a dc offset error at the integrator input. The dc offset is integrated by the integrator 52, which adjusts the laser frequency slightly off the resonance frequency until the resonance error signal has an amplitude and sign such that it cancels out the dc offset error. The laser frequency deviation from the resonance frequency can result in rotation sensing errors. The digital demodulator 64 also outputs a digital value that is approximately proportional to the frequency difference between the laser frequency and the resonator resonance frequency. Unlike the analog demodulator 60 and analog integrator 52, the digital demodulator 64 and digital accumulator 68 do not generate a dc offset error. The digital accumulator 68 and DAC 40 adjusts an analog signal at the Op Amp 50 until the digital demodulator 64 output is driven to zero, which only occurs when the laser frequency is at the resonance frequency. Therefore the digital feedback loop provides an analog correction signal that cancels out the dc offset error generated by the analog demodulator and analog integrator. Since changes in the dc offset error are caused mostly by aging and temperature effects, the change in dc offset error with time is very slow, typically much less than 1 Hz. Therefore, the digital correction loop does not need to be a high bandwidth signal to correct for analog errors. Since the bandwidth requirement on the digital loop is very low (below 1 Hz) the DAC 40 can be of the type that provides very high resolution, such as a σ-Δ DAC. High resolution of DAC 40 may be necessary to cancel out analog errors to a required level of accuracy.

The sensing element 24 outputs a sensing signal to the analog front-end circuit components 36, which process the sensing signal and sends it to the A/D converter 38 and the analog demodulator 60 in the analog demodulation component 30. The analog demodulator 60 demodulates the signal based on a signal from a local oscillator which is a phase shifted signal that is the output of the phase shifter 66 in the digital demodulation component 32. The phase shifter 66 receives the output of the comparator 44. The comparator 44 compares the modulation signal generated by the modulation generator 46 to some threshold voltage, for example zero volts. The output of the comparator 44 is a digital signal which transitions to a high or low state when the modulation signal passes through a threshold level. The modulation signal is also sent to the sensing element 24. The output of the analog demodulator 60 is filtered by the low pass filter 62.

The demodulator 64 demodulates the digital signal generated by the A/D converter 38 based on the signal from a local oscillator which is a phase shifted signal that is the output of the phase shifter 66. The accumulator 68 receives the output of the demodulator 64. The DAC 40 receives the output of the accumulator 68.

The Op Amp 50 receives the output of the low pass filter 62 and subtracts the DAC 40 output signal from the low pass filter 62 output signal. The analog integrator 52 integrates the difference determined by the Op Amp 50 to produce an adjusted error signal. The sensing element drive 54 generates a drive signal for the sensing element 24 based on the adjusted error signal from the Op Amp 50. The Op Amp 50 has an input offset voltage that will cause the analog integrator 52 to swing towards saturation, even if the error signal is at zero. However, as long as the offset voltage is small enough, the integrator output will change the laser frequency to be slightly off resonance in a way to generate an error signal that exactly cancels out the Op Amp offset voltage and thus maintains the integrator 52 in stable operation. Because of an Op Amp input offset voltage, the laser frequency will not be exactly on the resonance frequency, which will lead to a rotation sensing error. There are other error sources in the analog front-end and analog mixer that can have the same effect, and can be represented as an effective integrator input offset error. The digital demodulator 64 has much smaller errors than the analog demodulator 60 (both perform the same function of demodulation) and the digital accumulator 68 has much smaller errors than the analog integrator 52 (both perform the same function of integration). The accumulator 68 adjusts the DAC output until the digital demodulator 64 output is zero, which occurs when the laser frequency is at the resonator resonance frequency. Therefore, the DAC output is adjusted to exactly cancel out the analog errors such as integrator input offset.

Figure 2A:
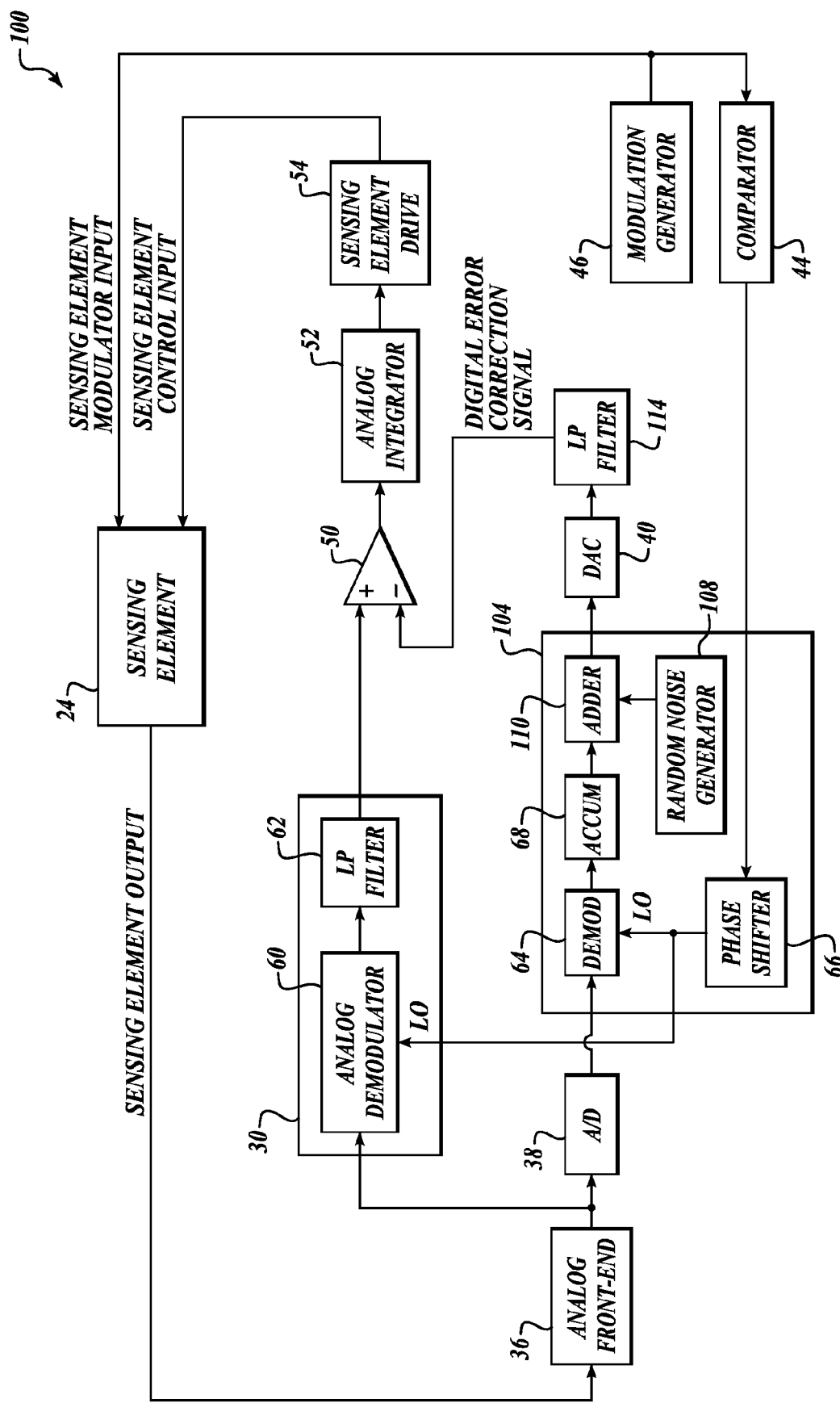

FIG. 2A shows a system 100 similar to system 20. The system 100 includes a digital demodulation component 104 that includes all the components of the digital demodulation component 32 but with a random noise generator 108 and an adder 110. The adder 110 adds a random number signal generated by the random noise generator 108 to the output of the digital accumulator 68. The DAC 40 receives the output of the adder 110. A low pass filter 114 filters the analog signal generated by the DAC 40. The random number signal is noise that improves the resolution of the DAC 40. The accumulator 68 can provide an output value with the desired resolution. However, standard low cost DACs may not provide the required resolution. By adding noise to the accumulator output value the effective resolution of the DAC can be significantly improved. The amplitude of the noise must be roughly a few bits of the DAC so that the DAC output is dithered about the accumulator output value. The output of the DAC for each DAC sample is still quantized to the DAC least significant bit (LSB). However, if many DAC samples are averaged together, the quantization of the average value is smaller than the DAC LSB. The level of quantization of the average value is reduced by increasing the number of DAC samples in the average. By increasing the DAC sample frequency the quantization of the average value can be decreased in a fixed time period. Therefore this technique requires a DAC that can operate at a much higher frequency than the bandwidth of the digital control loop in order to have enough DAC samples in an averaging time that does not impact the digital loop control bandwidth. The low pass filter 114 essentially averages the DAC output. If the random noise has frequency components that are within the digital loop bandwidth, then the random noise will contribute undesirable noise into the sensor. The random noise generator 108 can be made to provide noise that has frequency components only above the loop bandwidth and above the cut-off frequency of the low pass filter 114, which removes the noise before being added to the analog control loop.

Figure 2B:
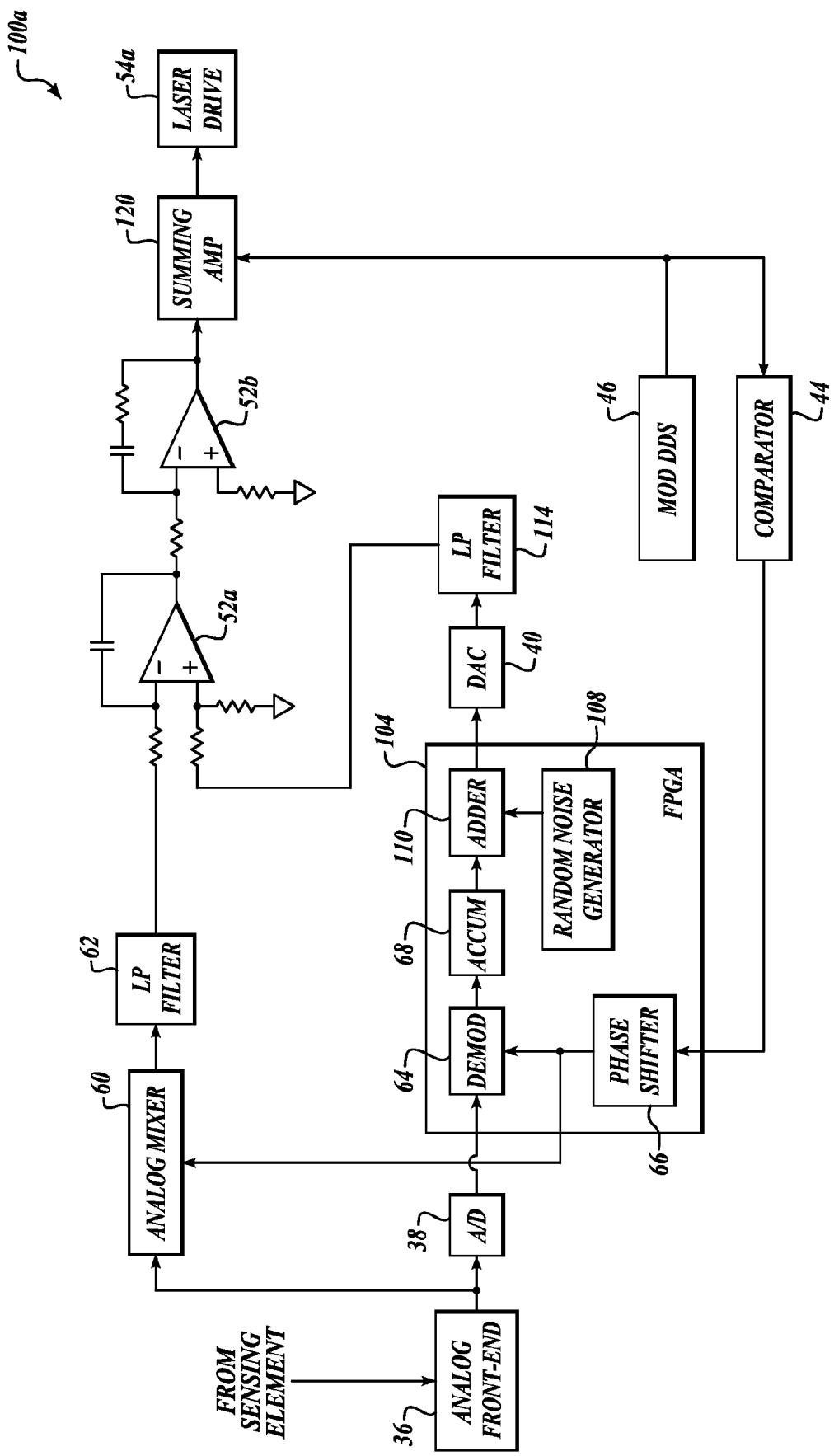

FIG. 2B illustrates a system 100a that includes the features of the system 100 but is applied to a Resonator Fiber Optic Gyro Laser Drive architecture. The system 100a includes an integrator 52a and another integrator 52b with a lead-lag circuit for employing a second order feedback loop, which is commonly used to provide a stable loop with very high bandwidth. A summing amplifier 120 receives the output of the second integrator 52b and outputs a signal to a laser drive component 54a. The summing amplifier 120 also receives the output of the modulation generator 46, which is a Direct Digital Synthesizer (DDS). The laser drive 54a provides both the modulation signal to detect the center of the resonator resonance feature and the control signal to lock the laser onto the resonance frequency.

Figure 3A:
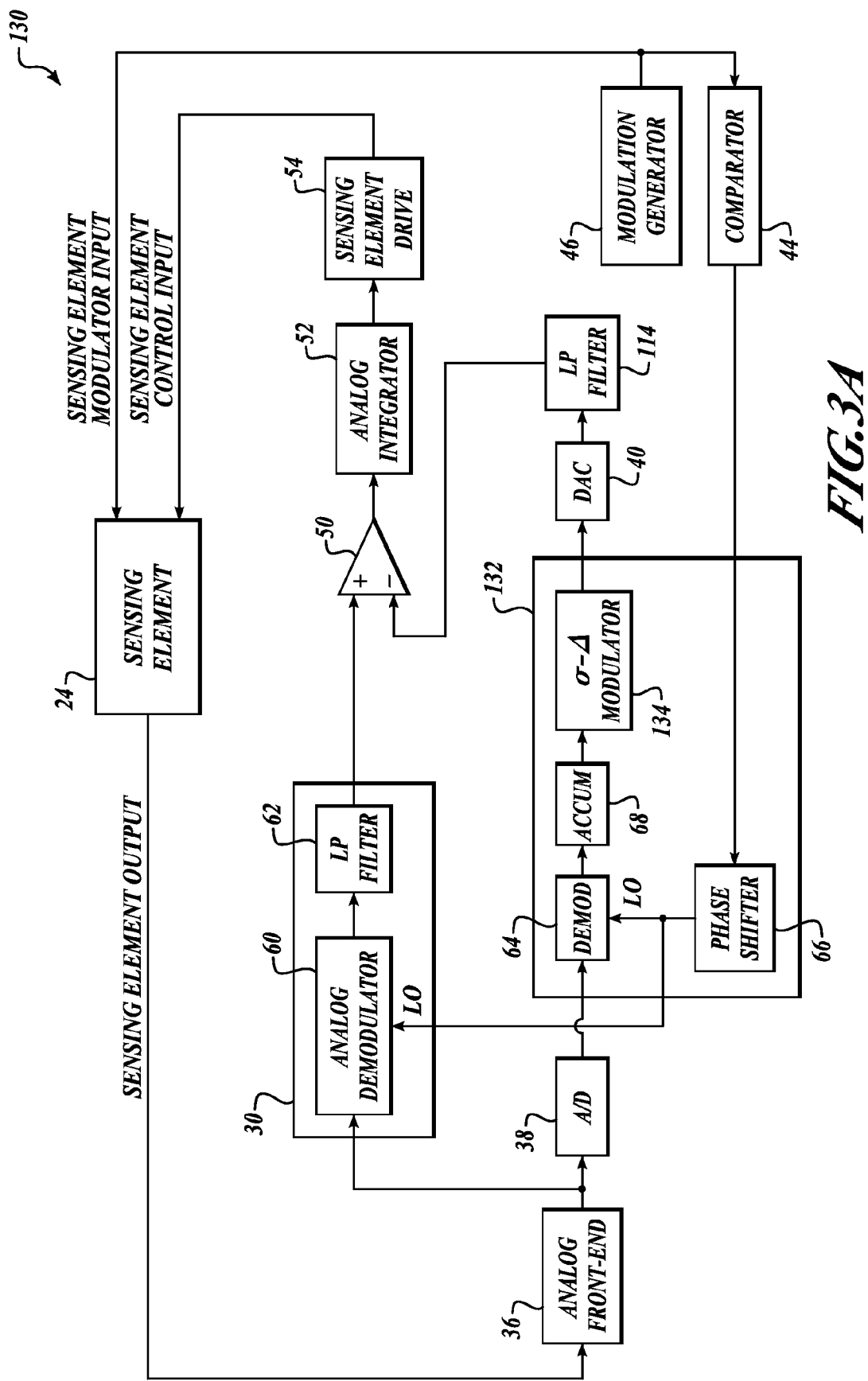

FIG. 3A illustrates another system 130 that includes a digital demodulation component 132 that includes all the components of the digital demodulation component 32 but with a σ-Δ modulator 134. The σ-Δ modulator 134 receives the output of the digital accumulator 68. The σ-Δ modulator 134 combined with DAC 40 increases the resolution of DAC 40 beyond the bit resolution of the DAC, allowing lower cost and lower power DACs to be used. The σ-Δ modulator does generate noise, but with a noise spectrum that decreases with decreasing frequency. The low pass filter 114 removes most of the noise generated by the σ-Δ modulator 134 before reaching the laser drive.

Figure 3B:
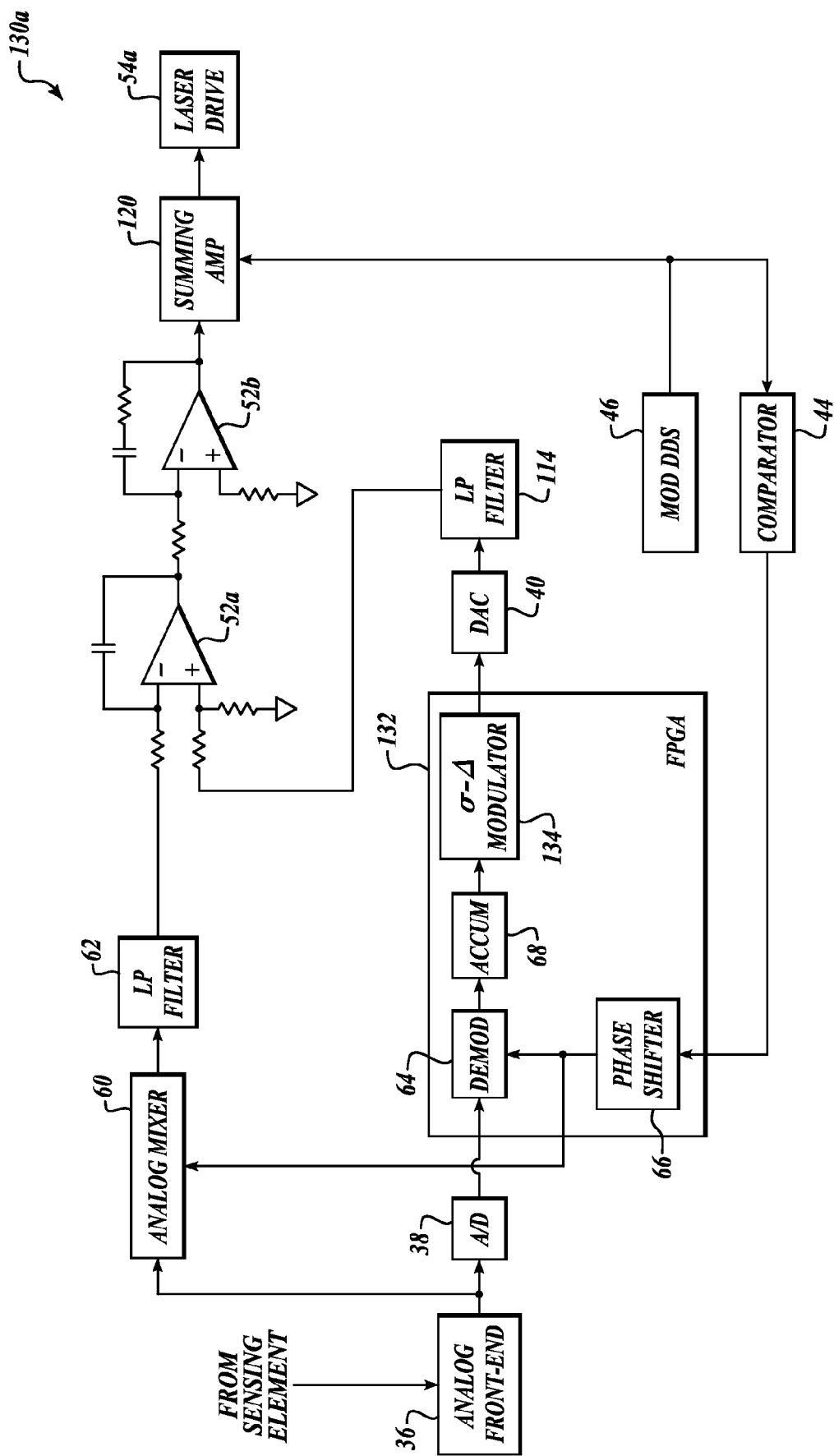

FIG. 3B shows a system 130a that is the system 130 that includes an integrator 52a and another integrator 52b with a lead-lag circuit for employing a second order feedback loop, with the digital demodulation component 132 and is used in a Resonator Fiber Optic Gyro Laser Drive architecture.

Figure 4A:
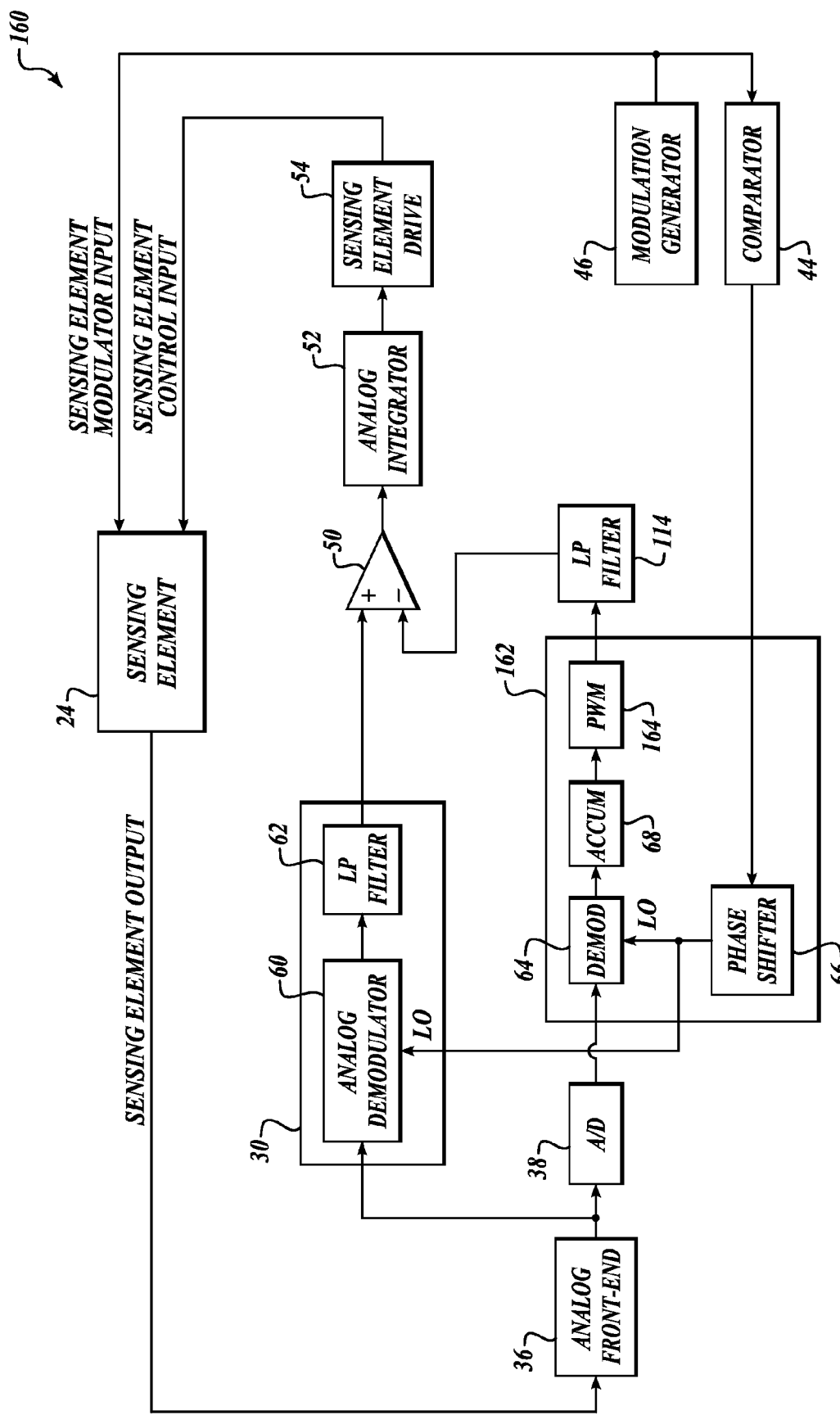

FIG. 4A illustrates another system 160 that includes a digital demodulation component 162 that includes all the components of the digital demodulation component 32 but with a pulse width modulator (PWM) 164. The PWM 164 receives the output of the digital accumulator 68. The pulse width of the output of PWM is proportional to the accumulator 68 output value. The low pass filter 114 averages the output signal from the PWM 164, thus converting the digital output to an analog signal. Because the PWM 164 and low pass filter 114 produces an analog signal, a DAC is not required, thus eliminating an active component and simplifying the design.

Figure 4B:
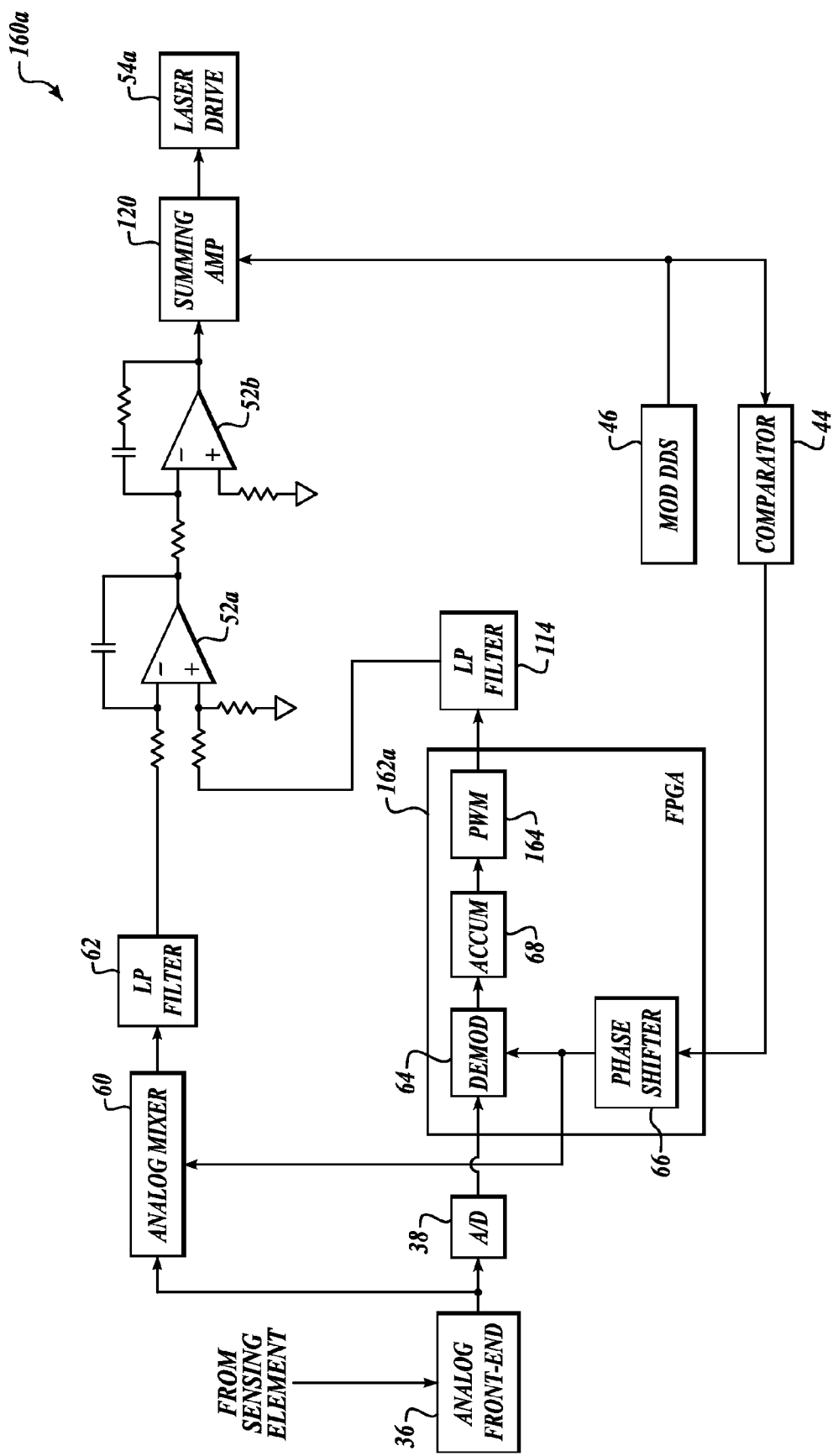

FIG. 4B shows a system 160a that is the system 160 that includes an integrator 52a and another integrator 52b with a lead-lag circuit for employing a second order feedback loop, with the digital demodulation component 162 and is used in a Resonator Fiber Optic Gyro Laser Drive architecture.

Low frequency wandering on the output signal of the analog loop (the analog demodulation component 30) is due to analog drift and temperature errors that typically occur at frequencies much less than 1 Hz. The higher frequency variation on the output signal of the analog loop is due to noise in the electronics, laser and resonator and finite bandwidth of the fast analog loop. If the digital loop is too slow, then it will not be able to follow the wandering part of output signal of the analog demodulation component 30, and the output signal of the DAC 40 or the digital loop will have some phase lag and lower amplitude, thus will not perfectly cancel out analog errors. Therefore, the digital loop (digital demodulation component 32) must be fast enough so that it can follow the drift and temperature induced analog errors to an acceptable level. If the digital loop is fast enough, the output signal of the DAC 40 or digital loop should look just like the lower frequency wandering part of the output signal of the analog loop and should be in phase. In one embodiment, the bandwidth of the fast analog loop is between 1 kHz and 1 MHz and the bandwidth of the digital loop is a few hertz or less to adequately follow the drift and temperature induced errors.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for providing feedback signals in a sensor system, the method comprising:
   demodulating a sense signal using an analog demodulator;
   demodulating the sense signal using a digital demodulator;
   determining the difference between the result of the analog demodulator and the digital demodulator;
   integrating the determined difference; and
   generating a sensor feedback control signal based on the integrated difference.

2. The method of claim 1, wherein demodulating the sense signal using a digital demodulator includes applying noise using a random noise generator to the digitally demodulated sense signal.

3. The method of claim 1, wherein demodulating the sense signal using the digital demodulator includes applying a modulation signal to the digitally demodulated sense signal using a σ-Δ modulator.

4. The method of claim 1, wherein demodulating the sense signal using the digital demodulator includes performing pulse width modulation to the digitally demodulated sense signal.

5. The method of claim 1, wherein analog loop bandwidth is between 1 kHz and 1 MHz.

6. The method of claim 5, wherein digital loop bandwidth is less than or equal to 5 Hz.

7. The method of claim 1, wherein integrating is performed using an analog integrator.

8. The method of claim 1, wherein the sensor system is a fiber optic sensor system.

9. The method of claim 8, wherein the fiber optic sensor system is a resonator fiber optic gyro sensor system.

10. A sensor system comprising:
    a sensor;
    an analog demodulator configured to demodulate a sense signal produced by the sensor;
    a digital demodulator configured to demodulate the sense signal;
    an Op Amp configured to determine the difference between the result of the analog demodulator and the digital demodulator;
    an integrator configured to integrate the determined difference; and
    a drive component configured to generate a sensor feedback control signal based on the integrated difference.

11. The system of claim 10, wherein the digital demodulator includes a random noise generator configured to apply a noise signal to the digitally demodulated sense signal.

12. The system of claim 10, wherein the digital demodulator includes a σ-Δ modulator configured to apply a modulation signal to the digitally demodulated sense signal.

13. The system of claim 10, wherein the digital demodulator includes a pulse width modulator configured to modulate the digitally demodulated sense signal.

14. The system of claim 10, wherein analog loop bandwidth is between 1 kHz and 1 MHz.

15. The system of claim 14, wherein digital loop bandwidth is less than or equal to 5 Hz.

16. The system of claim 10, wherein the integrator is an analog integrator.

17. The method of claim 10, wherein the sensor is a fiber optic sensor.

18. The method of claim 17, wherein the fiber optic sensor is a resonator fiber optic gyro sensor.

* * * * *